July 22, 1958
R. L. MILLER ET AL
2,844,775
SERVOMOTOR SELFBALANCING MEASURING APPARATUS
Filed Jan. 14, 1955
3 Sheets-Sheet 1
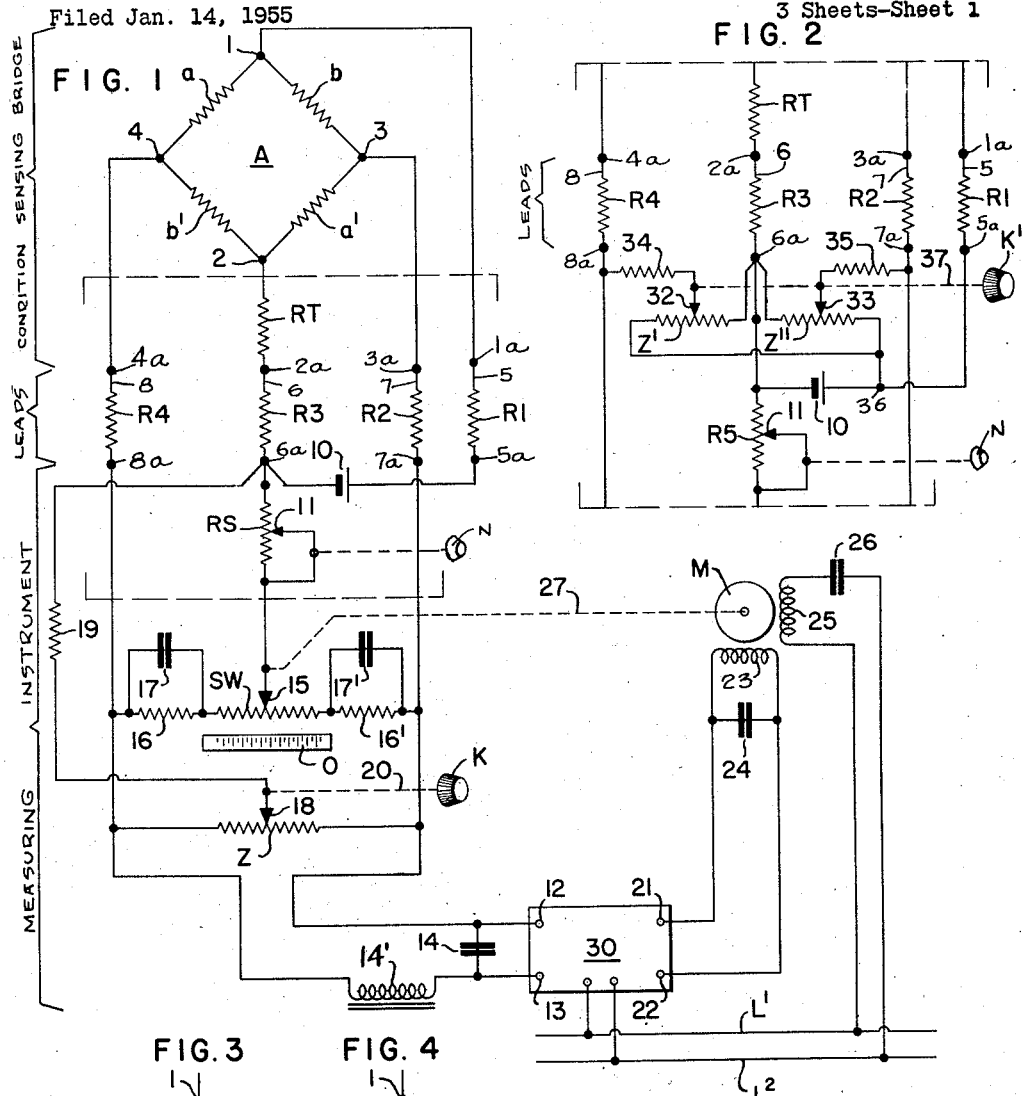
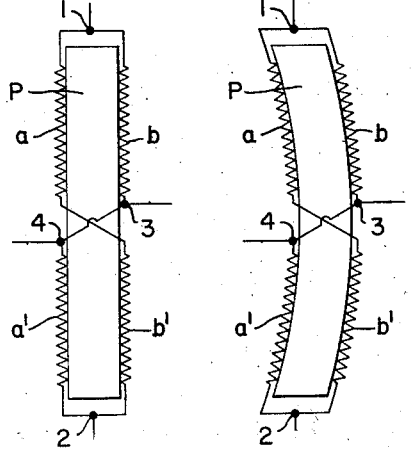
*INVENTORS.*
ROBERT L. MILLER
WILLIAM H. WANNAMAKER JR.
BY
Arthur H. Swenson
ATTORNEY.

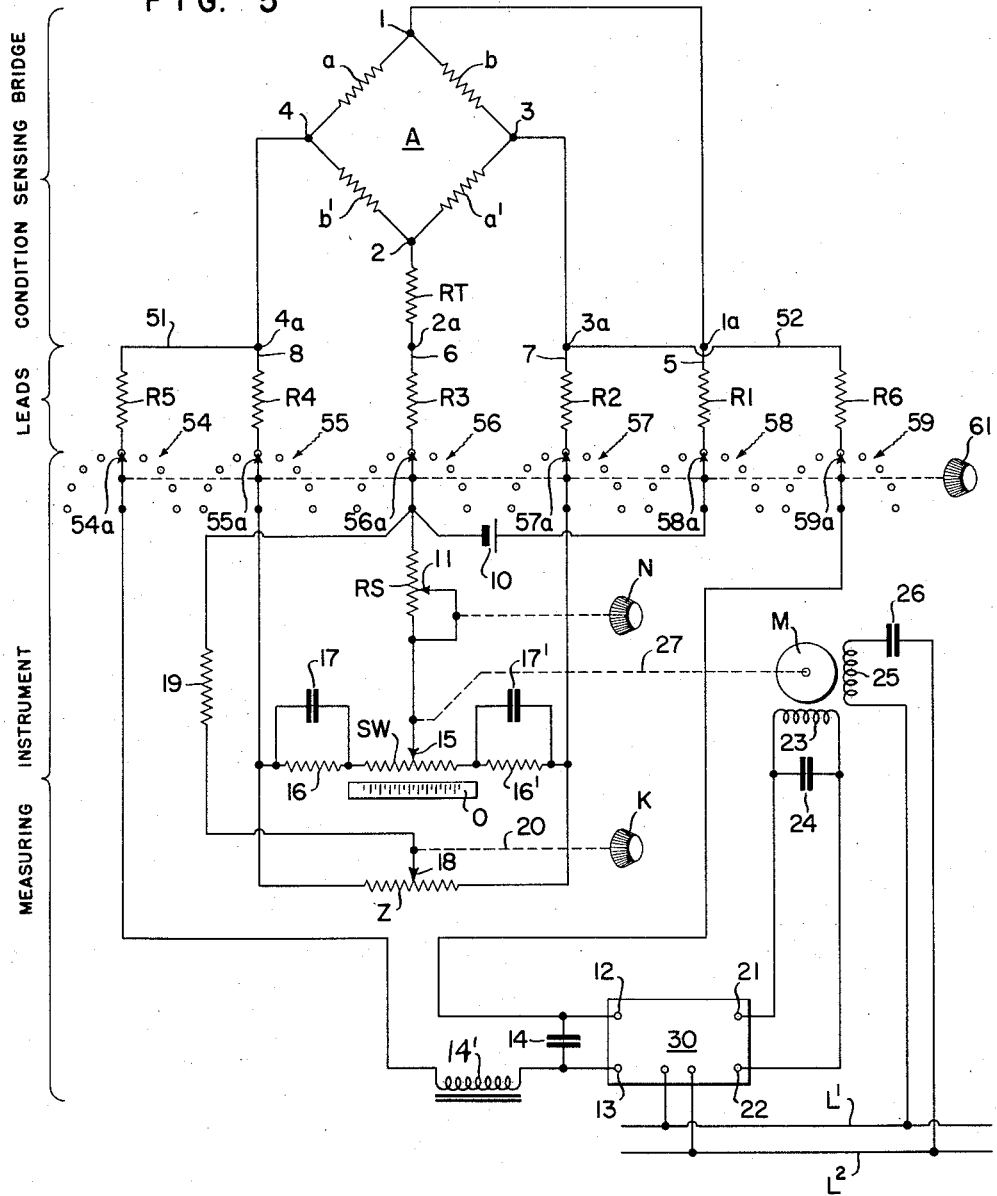

July 22, 1958
R. L. MILLER ET AL
2,844,775
SERVOMOTOR SELFBALANCING MEASURING APPARATUS
Filed Jan. 14, 1955
3 Sheets-Sheet 3
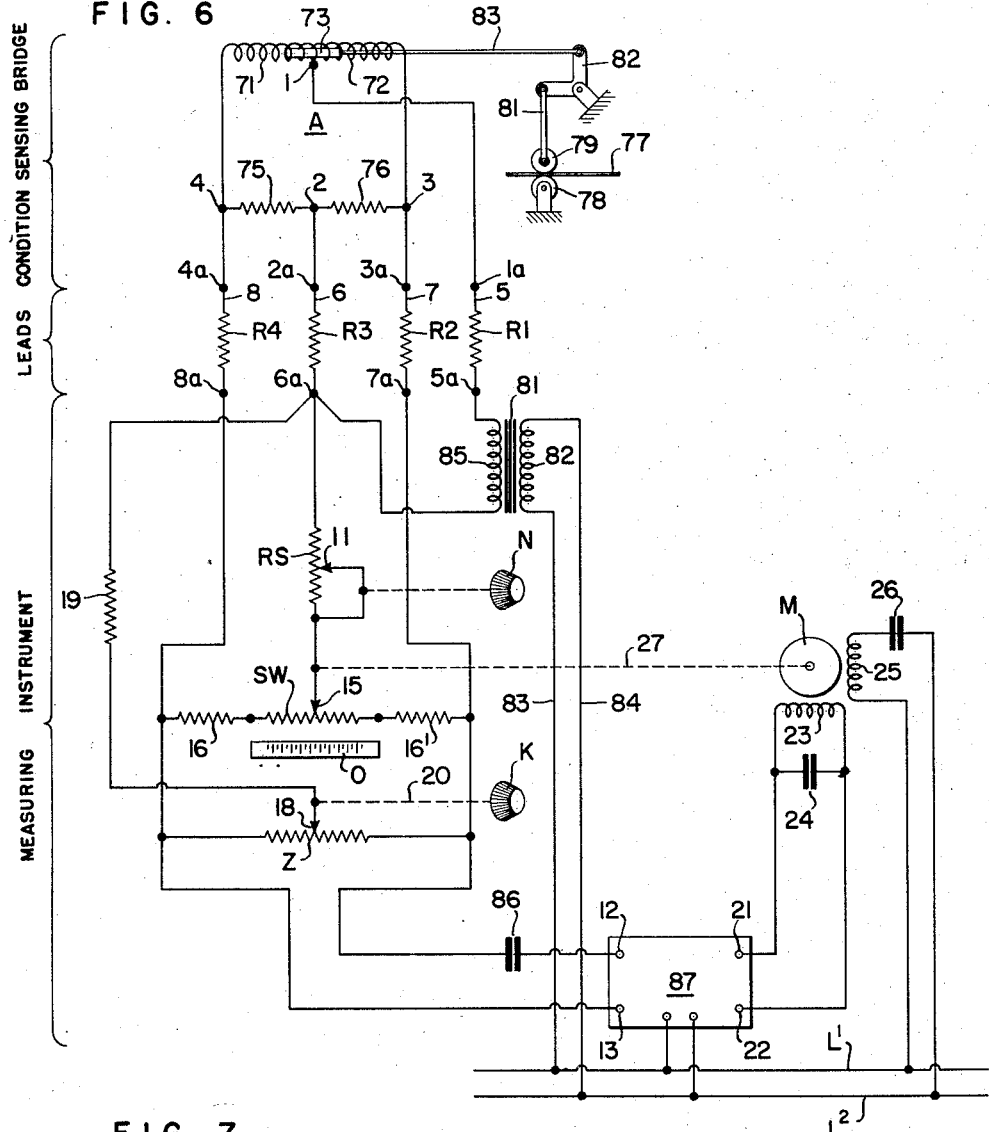
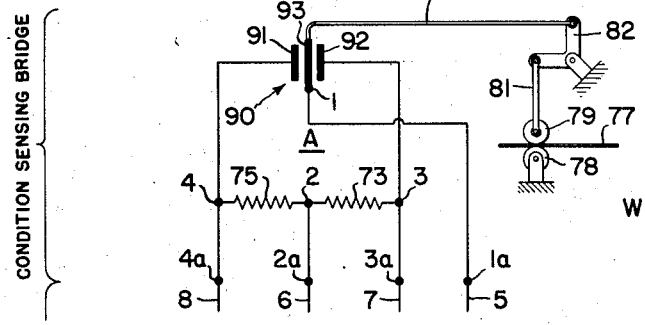
INVENTORS.
ROBERT L. MILLER
WILLIAM H. WANNAMAKER JR.
BY
ATTORNEY.

United States Patent Office 2,844,775
Patented July 22, 1958

2,844,775

SERVOMOTOR SELFBALANCING MEASURING APPARATUS

Robert L. Miller, Hatboro, and William H. Wannamaker, Jr., Philadelphia, Pa., assignors to Minneapolis-Honeywell Regulator Company, Minneapolis, Minn., a corporation of Delaware Application January 14, 1955, Serial No. 481,834

21 Claims. (Cl. 318—29)

This application is a continuation in part of application Serial No. 395,005, filed November 30, 1953, now abandoned.

A general object of the present invention is to provide an improved measuring apparatus of the type capable of measuring minute changes in a condition remote from the measuring apparatus. More specifically, the present invention is concerned with an electrical measuring apparatus for measuring, indicating, and recording changes in a condition sensitive bridge located a considerable distance from the measuring apparatus.

The present invention is particularly adapted for use with strain gauge elements. In such an application, for a given unit, the deformation of the strain sensitive elements, at rated load, is on the order of only a thousandths of an inch per length of the elements.

Accordingly, another specific object of the present invention is to provide a new and improved measuring system which is capable of detecting and measuring, with reliability and accuracy, minute deformations in strain sensitive elements.

The application of strain sensitive resistances to measurement problems often necessitates the location of such elements as much as a thousand feet or more from the measuring circuit. In addition, it is economically desirable to employ one measuring instrument with a plurality of strain gauges which may not necessarily be of the same range or located at equal distances from the measuring apparatus.

A further object of the present invention is to provide a new and improved measuring apparatus with readily adjustable and independent range changing and zero adjusting means.

A still further object of the present invention is to provide a measuring system in which the effect on the measurements of the resistances of the lead connections between the condition sensitive bridge and the measuring instrument are minimized or neutralized entirely.

In one form of commercially available strain gauge, the strain forces being measured act upon a load column. Four strain sensitive resistances, connected to form a Wheatstone bridge, are bonded to the load column in such a manner that two are subjected to compression and two are subjected to tension when a force is applied to the column. By the use of four strain sensitive resistances, the strain gauge automatically compensates itself for changes in the bridge resistances due to temperature and corrects itself for uniform expansion or contraction of the load column with temperature. Such gauges, however, generally use a thermally sensitive resistor, connected in series with the bridge supply terminals to provide compensation for the effect of temperature on the Young's modulus of the load column material.

It is therefore still another further object of the present invention to provide a measuring apparatus for use with such gauges in which the temperature compensating resistor therein compensates in the desired manner.

A further object of the present invention is to provide a new and improved apparatus which requires but one power supply which may be either A.-C. or D.-C. and does not require regulation.

The application of the present invention is not restricted to strain gauge measurements for it is equally adaptable for use with any type of bridge circuit. Another typical application of the present invention is with a motion transmission bridge in which two adjacent bridge arms comprise matched inductance coils enclosing a movable armature. The above mentioned combination provides an apparatus capable of measuring minute displacements of the armature even when the bridge is located a great distance from the measuring apparatus.

The various features of novelty which characterize the present invention are pointed out with particularity in the claims annexed to and forming a part of this specification. For a better understanding of the invention, its advantages, and specific objects attained with its use, reference should be had to the accompanying drawings and descriptive matter in which are illustrated and described preferred embodiments of the present invention.

Of the drawings:

Fig. 1 is a circuit diagram of the basic embodiment of the present invention;

Fig. 2 is a circuit diagram showing a modification of the zero adjusting means shown in Fig. 1 which permits relatively large independent span adjustments;

Fig. 3 is a schematic diagram showing a common form of strain gauge bridge in an unstrained condition;

Fig. 4 is a schematic diagram showing the strain gauge of Fig. 3 in a strain condition;

Fig. 5 is a circuit diagram showing a modification of the circuit of Fig. 1 wherein the effect of lead resistance can be neutralized;

Fig. 6 is a circuit diagram showing the present invention used with a motion transmission bridge; and Fig. 7 is a circuit diagram showing a modification of the circuit shown in Fig. 6.

Referring first to Fig. 1 there is diagrammatically illustrated a basic embodiment of the present invention including a Wheatstone bridge circuit A. As shown, the bridge circuit A comprises two similar resistors $a$ and $a'$ constituting one opposed pair of bridge arms and two similar resistors $b$ and $b'$ constituting a second pair of opposed bridge arms. The resistors $a$, $a'$, $b$, and $b'$ included in the circuit A may be associated with strain apparatus of such a character and in such manner that a strain impressed on the apparatus will increase the resistance of resistors $a$ and $a'$ and simultaneously decrease the resistance of the resistors $b$ and $b'$ in predetermined accordance with the direction and magnitude of the strain increases in the resistances of the resistors $a$ and $a'$. Means for effecting such variation in the resistances of the resistors $a$, $a'$, $b$, and $b'$ are illustrated in Figs. 3 and 4. As those skilled in the art will understand, in some application only one or two of the resistors $a$, $a'$, $b$ and $b'$, included in the circuit A may be strain responsive or subjected to strain. In any event the present invention is equally adapted to function as hereinafter described.

The junction points 1, 2, 3, and 4, of the bridge A are connected to the bridge terminals 1$a$, 2$a$, 3$a$, and 4$a$, respectively. The temperature compensating resistor RT is connected between the junction 2 and the bridge terminal 2$a$. The bridge terminals 1$a$, 2$a$, 3$a$, and 4$a$ are connected to the terminals of the measuring instrument 5$a$, 6$a$, 7$a$, and 8$a$ by means of the lead conductors 5, 6, 7, and 8, respectively. The lead conductors 5, 6, 7, and 8 have lead resistances designated as R1, R2, R3, and R4, respectively.

A source of bridge energizing current, shown here as the battery 10, is connected between the measuring instrument terminals 5a and 6a. The instrument terminals 7a an 8a are respectively connected to the input terminals 12 and 13 of the conversion type electronic amplifier 30. The amplifier input terminals are shunted by a condenser 14. An inductor 14' is included in the lead conductor adjacent to the condenser 14. A balancing slidewire SW and adjacent resistors 16 and 16', are connected between the instrument terminals 7a and 8a. One end of the resistor 16 is connected to instrument terminal 8a and the other end is connected to one end terminal of the slidewire SW. Similarly, one end of the resistor 16' is connected to the instrument terminal 7a and the other is connected to the other end terminal of the slidewire SW. The resistors 16 and 16' are shunted by condensers 17 and 17' respectively and cooperate therewith to subject the rebalancing mechanism to a damping action. The rebalancing connection between the instrument terminal 6a and the wiper 15, engaging and adjustable along the slidewire SW, includes a span adjusting resistor RS. The span adjusting resistor RS is shown as including a shunt 11 adjustable along the resistor RS, by means of the knob N, to vary the magnitude of a portion of that resistance included in the measuring circuit. A separate zero adjusting slidewire Z is also connected between the instrument terminals 7a and 8a. A wiper contact 18, which engages and is adjustable along the slide-wire A, is connected to the instrument terminal 6a by a resistor 19. The wiper contact 18, as shown, is arranged for manual adjustment by means of a rotatable knob K and an actuator 20 in threaded engagement with said knob. The rebalancing adjustment of the contact 15 along the slidewire SW is effected automatically by the amplifier 30 and the associated rebalancing mechanism.

The amplifier and rebalancing mechanism may take any one of various well-known forms. As shown, the conversion type amplifier 30 and associated reversible motor M form self balancing apparatus of a well-known and widely used type disclosed and claimed in the Wills Patent 2,423,540, of July 8, 1947. As diagrammatically shown, the amplifier 30 has its output terminals 21 and 22 connected to a winding 23 and a condenser 24 in parallel with said winding. The winding 23 forms the control winding of the motor M which is a reversible two-phase induction motor. The motor includes a power winding 25 connected across the alternating current supply conductors $L^1$ and $L^2$ in series with the phase shifting condenser 26.

The motor M rotates in one direction or in the opposite direction depending upon the direction of current flow between the leads 7 and 8 through the input terminals 12 and 13 of the amplifier. The resulting rotation of the motor M adjusts the wiper contact 15 along the slidewire resistor SW in the direction and to the extent required to eliminate the potential difference between the amplifier input terminals 12 and 13. In the normal balance condition of the apparatus, there is virtually no current flow between the amplifier terminals 12 and 13. The motor M adjusts the wiper contact 15 through an operating connection shown diagrammatically as the linkage 27. As shown the wiper contact 15 moves longitudinally along the scale O when balance is disturbed.

As has been noted, those skilled in the art will understand that resistors a, a', b, and b' included in the circuit A, may be associated with strain apparatus so that the strain in a given direction will decrease the resistance of the resistors a and a' and simultaneously proportionally increase the resistances of the resistors b and b'. Thus, as is diagrammatically illustrated in Figs. 3 and 4, the resistors a and a' may be arranged end to end at one side of the bar P while the resistors b and b' are arranged end to end alongside the opposite side of the bar. The bar P may be so formed that when not subject to strain it will have the straight form shown in Fig. 3 and the resistors a and a' may have the same lengths and resistances as the resistors b and b'. With the parts so constructed and arranged, the application of a strain force to the bar P will bend the bar from its straight form shown in Fig. 3 into its curved form shown in Fig. 4. With the resistors a, a', b and b' suitably constructed and suitably attached to the bar P, the effect of such strain force will be to shorten and decrease the resistance of the resistors a and a' and to proportionally elongate and increase the resistances of the resistors b and b'.

The balance of the measuring system is obtained by the rotation of the motor M, into the position in which the input voltage to the amplifier becomes zero. This means that, at balance, the voltage between the left hand terminal of the resistor 16 and the wiper contact 15 must be equal and opposite to the voltage drop between said contact and the righthand terminal of the resistor 16'. When the apparatus is unbalanced, the rebalancing motor is actuated by the amplifier as is necessary to adjust the slider contact SW to the position necessary to cause the last mentioned voltage drops to become equal and opposite and hence to return the apparatus to its balance condition.

If the condition being measured requires a relatively large span or measuring range it has been found desirable to employ the circuit modification shown in Fig. 2, for adjusting the zero point of the bridge. With this modification it is possible to maintain a desired independence between span and zero adjustments even over extremely large ranges. As shown, the span adjusting resistor RS is connected between the wiper contact 15 and the measuring instrument terminal 6a. The two slidewire resistors Z' and Z" are employed for zero adjustment. These slidewires have their adjacent end terminals connected to the instrument terminal 6a and their other end terminals connected to the point 36 which is in turn connected to the instrument terminal 5a. Wiper contacts 32 and 33 are adjustable along the slidewire resistors Z' and Z" respectively. A resistor 34 is connected between the instrument terminal 8a and the wiper contact 32 and the resistor 35 is connected between the instrument terminal 7a and the wiper contact 33. The wiper contacts 32 and 33 are arranged for simultaneous manual adjustment by means of the rotatable knob K' and the actuator 37.

In connection with the foregoing circuits, it is noted that the strain element bridge A is balanced for zero output only when the strain gauge elements are in the unstressed condition. At that time, the resistance of the four elements a, a', b, and b' would be equal, or may be made equal in a known manner. For this unstressed condition of the strain gauge bridge A, the sliding contact 15 on the slidewire SW will come to balance at a position dependent upon the resistances of the lead conductors 6, 7, and 8, the resistors 16 and 16', and the slidewire SW and the position of the sliding contact 18 on the zero adjusting slidewire Z. Assuming that the resistances R2 and R4 of the lead conductors 7 and 8 respectively are equal as they should be, the point of circuit balance can be chosen by appropriately apportioning the value of the resistances of the slidewire SW and the resistors 16 and 16', disregarding the effect of the zero adjusting means. If it is desired to have a zero center instrument, this can be accomplished by making the value of the resistors 16 and 16' equal. Similarly, if it is desired to have the circuit point of balance at the right hand terminal of the slidewire SW this can be accomplished by making the value of the slidewire SW and the resistor 16 equal to the value of the resistor 16'. Assuming that the point of instrument balance has been selected as the center of the slidewire SW, an unstressed bridge condition will cause equal currents to flow through the two portions of the slidewire SW and the related end resistors 16 and 16', whereby the requisite equality of voltage drops across the portions of the slidewire and related end resistors 16 and 16' for balance will be had when the slider contact occupies its electrical mid position.

As previously explained, when the unstressed gauge bar P is stressed in one direction, the resistance of the elements *a* and *a'* will be decreased by equal amounts and the elements *b* and *b'* will have their resistances similarly increased. The described changes in the resistances of the strain gauge resistors when the previously unstressed bar P is stressed, unbalances the current flowing through the halves of the slidewire SW and causes a resultant voltage to appear between the amplifier input terminals. In response to that voltage, the amplifier 30 actuates the motor M to move the slidewire contact 15 to a new position in which the ratio of the resistances of the portions of the slidewire resistance at opposite sides of the contact 15 is proportional to the ratio of the two different currents caused to flow through those two portions of the slidewire as a result of the unbalance of the strain element bridge. When the slider contact 15 has been driven to its balancing position, the voltage drop across the two portions of the slidewire and the related end resistors will again be equal and opposite and the bridge circuit will be balanced. Thereafter, the slidewire contact 15 will be maintained in its new position until a subsequent change in the measured strain occurs. That change will cause the apparatus to be re-balanced by movement of the slider contact 15 to a new balancing position in a similar manner.

Since the position of the contact 15 along the slidewire SW is thus indicative of the extent of the strain element bridge unbalance, and hence the magnitude of strain, the scale O cooperates with the slidewire contact 15 to provide an indication of the measured strain at any time. The scale measurements will be substantially linear with strain, a non-linearity being negligible under conditions of normal strain measurement.

It should be obvious from the foregoing that the voltage which appears across the slidewire and related end resistors when the apparatus is unbalanced is not only of a magnitude dependent upon the extent of the apparatus unbalance, but is also of a polarity dependent upon the direction of apparatus unbalance and controlling the direction in which the slider contact 15 must be moved in order to reestablish the balanced condition.

The adjustable span adjusting resistor RS located between the instrument terminal 6*a* and the wiper contact 15, constitutes a means for adjusting the amount of slidewire contact movement which is obtained for a given change in measured strain, and thus provides span adjustment which is independent of the zero adjustment position of the contact 18 shown in Fig. 1.

The zero adjustment slidewire Z in Fig. 1 and the zero adjustment slidewires Z' and Z'' in Fig. 2 are utilized to provide means by which the rebalancing slidewire contact 15 may be caused to assume any desired, predetermined zero position along the slidewire SW for any given initial condition of strain and strain bridge unbalance. The position into which the zero adjusting contact 18 in Fig. 1 and the zero adjusting contacts 32 and 33 in Fig. 2 are manually adjusted, determines the ratio of the currents in the portion of the strain gauge element bridge irrespective of strain, and hence causes the rebalancing slidewire resistor 15 to assume any desired position for balance at that particular strain condition.

The temperature compensating resistor RT shown in Fig. 1, serves the purpose of preventing the measurements made with the apparatus from being effected by changes in the modulus of elasticity of the test cell caused solely by changes in the ambient temperature to which the material is subjected. It is to be noted that the strain element bridge itself being self compensating is not responsive to ambient temperature changes, and that the temperature compensation effected in the strain apparatus is made solely to eliminate the effects on the measurement of changes in the modulus of the material of the load column or bar P to ambient temperature changes therein. The electrical effect needed to compensate for ambient temperature changes is a resistance in series with the bridge energizing source.

The damping condensers 17 and 17' provide desirable instrument damping action which enables the instrument to rebalance the measuring circuit in a minimum of time without overshooting the point of balance and subsequently hunting. In some applications this damping action can be obtained with only one of these condensers and the other can be eliminated.

The circuit of Fig. 1 is designed to minimize the effect of lead length resistance on the measurements. Such errors result from the current flow through the lead conductors 6, 7, and 8. For any given installation, most measuring systems can be calibrated to eliminate the effect of lead resistance, however, such calibration is often difficult to achieve and is costly and therefore impractical. With the configuration shown in Fig. 1, the effect of lead resistance on measurements is negligible for lead lengths up to a few hundred feet if the gauge of the leads is suitable.

Referring now to Fig. 5 there is shown a circuit diagram of a modification of the circuit of Fig. 1 wherein the effect of lead resistance between the strain gauge and the measuring instrument can be neutralized entirely. Similar reference characters have been employed to designate the corresponding elements of Fig. 1 and these will not be discussed in detail. The distinction between the circuit of Fig. 1 and the circuit of Fig. 5 is that the input terminals 12 and 13 of the amplifier 30 are connected across the output terminals 3*a* and 4*a* of the bridge circuit A by means of separate lead conductors 51 and 52. With this modification, the effect on the measurements of the resistances of the lead conductors 6, 7, and 8 can be neutralized entirely. It should be noted that the resistances of the lead conductors 5, 51, and 52 do not effect the measurements.

The system of Fig. 5 is shown adapted for use with a plurality of strain gauges, an application which requires that the effect of lead resistance be neutralized especially where the various strain gauges may be located at different distances from the measuring instrument. To this end the 6-deck multi-point switch 53 is employed for connecting the various strain gauges to the measuring instrument. The switch 53 includes decks 54, 55, 56, 57, 58, and 59 each having a plurality of stationary contacts and movable contacts 54*a*, 55*a*, 56*a*, 57*a*, 58*a*, and 59*a* respectively. The movable contacts of each deck are ganged to the switch knob 61 for simultaneous operation. In this application, the stationary contacts of the switch 53 serve as the terminals of the measuring circuit, there being a set of stationary contacts for each strain gauge being measured. Thus, the stationary contacts of the deck 55 correspond to the instrument terminal 8*a* of the measuring system of Fig. 1, the contacts of deck 56 correspond to the instrument terminal 6*a* of Fig. 1, the contacts of deck 57 correspond to the instrument terminal 7*a* of Fig. 1 and the contacts of deck 58 correspond to the instrument terminal 5*a* of Fig. 1. The contacts of deck 54 and 59 constitute new instrument terminals so that the input terminals of the amplifier 30 can be connected to the output terminals of the bridge A by means of separate leads.

There are many ways of neutralizing the effect of lead resistance on strain measurements in the circuit of Fig. 5. A practical method of achieving this comprises making the resistances R2 and R4 of the lead conductors 7 and 8 equal and making the resistance R3 of lead conductor 6 equal to one-half the equal resistances R2 and R4 of the lead conductors 7 and 8. This can be done by appropriately selecting the gauge of these lead conductors. If the equality just described is employed in selecting the lead conductors for each of the strain gauges to be employed with the measuring circuit of Fig. 5, each gauge can be connected to the measuring circuit without introducing errors due to lead length even though the sets of leads for these gauges have different lengths.

It can also be shown that if the resistance of the slidewire 15 plus the resistances of the resistors 16 and 16′ are made equal to twice the nominal resistance of the strain gauge A plus four times the nominal resistance of the temperature compensating resistor RT that leads of equal resistance can be employed for the lead conductors 6, 7, and 8 without introducing errors due to lead lengths. This method, however, is practical only when all gauges to be used with the measuring circuit have the same nominal value and equal temperature compensating resistors.

A qualitative analysis of the circuit of Fig. 5 will show how the above mentioned lead length neutralization is effected. Disregarding for the moment the effect of the resistance R3 of the lead conductor 6, it can be seen that the resistances R2 and R4 of the lead conductors 7 and 8 will reduce the current flow in the rebalancing slidewire branch. The effect of this reduction in slidewire current will force the sliding contact 15 to move a greater distance along the slidewire SW to achieve circuit balance. The effect of the resistance R3 of the lead conductor 6, on the other hand, is such as to reduce the travel required of the sliding contact 15 to achieve circuit balance. This can be seen if the effect of the resistances R2 and R4 of the lead conductors 7 and 8 are disregarded. At unbalance, any resistance in series with the bridge energizing source will reduce the bridge output. With a reduced bridge output the travel to balance of the sliding contact 15 will be proportionally reduced. Thus, the effect of the resistances R2 and R4 of the lead conductors 7 and 8 are opposed to the effect of the resistance R3 of the lead conductor 6 and it can be seen that by a proper apportionment of these resistances the effect of lead conductor resistance upon measurements can be neutralized entirely.

The application of the present invention is not restricted to strain gauge measurements for it is equally adaptable for use with other types of bridge circuit. Fig. 6 is a circuit diagram of a modification of the circuit of Fig. 1 whereby it is adapted for use with a motion transmission bridge. Similar reference characters have been employed to designate corresponding elements and these elements will not be described in detail. The condition sensitive bridge circuit A has for two of its adjacent arms a pair of matched inductance coils 71 and 72 enclosing a movable armature 73. The other two adjacent bridge arms are the equal resistors 75 and 76. The junction points 1, 2, 3, and 4 of the bridge circuit A are connected to the bridge terminals 1a, 2a, 3a, 4a respectively in a manner similar to the showing of Fig. 1. The motion transmission bridge A as shown here adapted for use in transmitting a signal proportional to the thickness of a foil 77. The foil 77 is passed between the stationary roller 78 and the movable roller 79. The movable roller 79 is adapted for vertical motion as controlled by the thickness of the foil 77. This vertical motion is transmitted through the linkage 81, the bell crank 82 and the bar 83 to the movable armature 73 within the matched inductance coils 71 and 72. Thus, variations in the thickness of the foil 77 will cause the armature 73 to move longitudinally within coils 71 and 72.

The motion transmission bridge A is connected to the measuring instrument by the leads 5, 6, 7, and 8 in a manner similar to that shown in the circuit of Fig. 1. The measuring circuit of Fig. 7 however has been slightly modified for A.-C. energization. As shown, the source of bridge energizing current is the transformer 81 having its primary winding 82 connected across the alternating current conductors L¹ and L² by means of the leads 83 and 84. The secondary winding 85 of the transformer 81 has its end terminals connected to the instrument input terminals 6a and 5a respectively. With the bridge circuit and measuring circuit energized with alternating current, the damping condensers 17 and 17′ of Fig. 1 will no longer provide instrument damping and thus they are not included in the circuit of Fig. 6. In addition, the low pass noise elimination filter comprising the inductance LC and condenser 14, connected between the measuring circuit in the input of the amplifier 30 of Fig. 1, has also been eliminated from the circuit of Fig. 6. However, a phase correcting condenser 86 has been included in the circuit. The value of the condenser 86 is selected to bring the bridge unbalance signal into phase with the phase discriminator in the motor drive amplifier 87. Since the bridge unbalance is an alternating current signal, the conversion type amplifier 30 of Fig. 1 has been replaced with an A.-C. amplifier 87 which is operative to drive the reversible motor M in the direction and to the extent necessary to position the sliding contact 15 on the slidewire SW to bring the system back into balance.

The operation of the circuit of Fig. 6 is similar to the operation of the circuit of Fig. 1 with small displacements of the armature 73 within the coils 71 and 72 causing the repositioning of the contact 15 on the rebalancing slidewire SW. Like the system of Fig. 1, this circuit is particularly adapted for applications where the condition sensitive bridge A is located considerable distances from the measuring apparatus. Thus, this circuit has wide application in the field of telemetering, over considerable distances, signals indicative of minute displacements.

Referring now to Fig. 7 there is shown a modification of Fig. 6 wherein the matched inductance coils 71 and 72 of Fig. 6 have been replaced by a parallel plate condenser 90. The condenser 90 comprises two stationary plates 90 and 91 arranged adjacent a movable plate 93 which is attached to the bar 83. The system as shown in Fig. 8 operates in a manner similar to the system shown in Fig. 6, that is, changes in the thickness of the foil 77 as it passes between the rollers 78 and 79 position the movable plate 93 of the condenser 90 with respect to the stationary plates 90 and 91. The repositioning of the movable plate 93 of the condenser 90 will cause the slidewire contact 15 on the slidewire SW to assume a new position indicative of the position of the movable plate 93.

While the circuits of Figs. 6 and 7 of necessity have been shown energized with alternating current, it should be understood that the circuits of Figs. 1, 2, and 5 can also be energized with alternating current with the modification of the circuit as shown in Fig. 6. If it is desirable to obtain the average input of a plurality of strain gauges, these gauges may be connected in parallel with one another to the measuring instrument and the positions of the sliding contact 15 on the slidewire SW will indicate the average strain being applied to these gauges. It will be apparent that the zero adjusting means shown in Fig. 2 can be utilized with the circuits of Figs. 5, 6, and 7 in the same manner in which it has been shown being utilized in the circuit of Fig. 1. Similarly, the six lead conductor system of Fig. 5 can be applied to the circuits of Figs. 6 and 7 without modification of these circuits.

While the measuring circuit of the present invention has been shown adapted for use with a strain gauge bridge and two types of motion transmitting bridges its use is not limited to these applications. As those skilled in the art will recognize practically any type of bridge circuit can be substituted for the bridge circuits illustrated and described in this application. By way of example, the output of a bridge circuit having for its arms one or more resistances which are sensitive to conditions such as pressure, temperature, or humidity could be measured with equal facility. It should also be noted that if it is desirable to achieve a compensating effect, a resistance sensitive to the condition for which compensation is desired may be connected in the circuit at the location of the temperature compensating resistor RT of Figs. 1 and 5.

While, in accordance with the provisions of the statutes, there has been illustrated and described the best forms and embodiments of the present invention now known, it will be apparent to those skilled in the art that changes may be made in the forms of the apparatus disclosed without departing from the spirit of the invention as set forth in the appended claims and that in some cases certain features of the invention may be used to advantage without a corresponding use of other features.

Having now described this invention, what is new and for which it is desired to secure Letters Patent is:

1. In combination, a Wheatstone bridge circuit having a pair of input terminals and a pair of output terminals, a rebalancing circuit having six terminals and comprising bridge energizing means, span adjusting means, zero adjusting means including a slidewire resistance having a shiftable contactor, rebalancing means including a slidewire resistance having a shiftable contactor, a reversible motor for actuating said last named shiftable contactor and an amplifier for controlling said motor, the input of said amplifier being connected to the first two of said six terminals, said zero adjusting means and said rebalancing means being connected in parallel to the second two of said six terminals, said energizing means being connected to the third two of said six terminals, both of the said shiftable contactors being connected to one of said last two named terminals, said span adjusting means being included in the connection connecting said second named shiftable contactor to one of said last two named terminals, two leads connecting the first two of said six terminals to the output terminals of said bridge circuit, two leads connecting the second two of said six terminals to the output terminals of said bridge, and two leads connecting the third two of said six terminals to the input terminals of said bridge.

2. Strain measuring apparatus comprising in combination, strain responsive resistors connected to form the arms and junctions of a Wheatstone bridge circuit, said resistors being arranged to increase and decrease in resistance in response to a strain force change in one direction or in the opposite direction, respectively, and each opposed pair of resistors being arranged to increase or decrease in resistance in response to a change in the direction of strain which causes the other two resistors to respectively decrease and increase in resistance, an energizing current source connected between a first opposing pair of bridge junctions by first and second lead conductors, a slidewire resistor circuit branch connected between a second pair of opposed bridge junctions by means of third and fourth lead conductors having approximately equal resistances, the resistance of said first lead conductor being approximately one-half as great as each of the equal resistances of said third and fourth lead conductors, said slidewire resistor circuit including a slidewire resistor, a wiper contact engaging and adjustable along said slidewire resistor and connected to said energizing current source at its junction with a first lead conductor, and automatic rebalancing means including an amplifier responsive to the potential difference across said second pair of bridge junctions and a rebalancing motor actuated by said amplifier to adjust the wiper contact engaging the slidewire resistor required to equalize the potential of the second pair of bridge junctions.

3. Measuring apparatus for use with a bridge circuit having for its arms resistors at least one of which is varied in accordance with the magnitude of a variable comprising in combination an energizing bridge circuit connected to input terminals of said bridge and including an energizing current source and a temperature compensating resistor, a slidewire resistor and damping means connected between a second pair of bridge terminals, a wiper contact engaging and adjustable along said slidewire resistor and connected to said energizing circuit branch, automatic rebalancing means including an amplifier responsive to the potential difference between the ends of said slidewire resistor and a rebalancing motor actuated by said amplifier to adjust the wiper contact engaging the slidewire resistor required to equalize potentials of the second pair of bridge terminals, and zero adjusting means connected between said second pair of bridge terminals and said energizing circuit branch.

4. A measuring apparatus comprising in combination a Wheatstone bridge circuit having resistors for its arms at least one of which is responsive to the condition being measured, an energizing circuit branch connected between an opposed pair of bridge junctions and including an energizing current source, a slidewire resistor connected between a second pair of bridge junctions, a wiper contact engaging and adjustable along said slidewire resistor and connected to said energizing circuit branch, automatic rebalancing means including an amplifier responsive to the potential difference between the ends of said slidewire resistor and a rebalancing motor actuated by said amplifier to adjust the wiper contact engaging the slidewire resistor required to equalize the potentials of the second pair of bridge junctions, and a temperature compensating resistor in said energizing circuit branch.

5. A strain measuring apparatus comprising in combination, a bridge circuit having four resistance arms at least one of which is varied in accordance with a strain force being measured, an energizing circuit branch connected between an opposed pair of bridge junctions and including an energizing current source, a slidewire resistor connected between the second pair of bridge junctions, a wiper contact engaging and adjustable along said slidewire resistor, a variable span adjusting resistor connected between said wiper contacts and said energizing circuit branch, an automatic rebalancing means including an amplifier responsive to the potential difference between the ends of said slidewire resistor and a rebalancing motor actuated by said amplifier to adjust the wiper contact engaging the slidewire resistor required to equalize the potentials of the second pair of bridge junctions.

6. Measuring apparatus comprising in combination a strain responsive bridge circuit in which one or more of the bridge arms is varied in accordance with the strain condition being measured, an energizing circuit branch connected between a first opposing pair of bridge junctions and including an energizing current source and first and second lead conductors connecting said source to the first opposing pair of bridge junctions, a slidewire resistor circuit branch connected between a second pair of opposed bridge junctions by means of third and fourth lead conductors, said slidewire resistor circuit including a slidewire resistor, a wiper contact engaging and adjustable along said slidewire resistor and connected to said energizing circuit branch at a point between the first lead conductor and said source, and automatic rebalancing means including an amplifier responsive to the potential difference between the second pair of bridge junctions, a rebalancing motor actuated by said amplifier to adjust the wiper contact engaging the slidewire resistor required to equalize the potential of the second pair of bridge junctions, and zero adjusting means connected between said second pair of opposed bridge junctions by means of said third and fourth lead conductors.

7. Apparatus as specified in claim 6 wherein said zero adjusting means comprises a slidewire resistor having a wiper contact connected to said energizing circuit branch at a point between the first lead conductor and said source.

8. Apparatus as specified in claim 6 wherein said zero adjusting means comprises two slidewire resistors each having slidable contacts, one end terminal of each of said slidewires being connected to said energizing circuit branch at a point between the first lead conductor and said source, the other end terminal of each of said slidewires being connected to said energizing circuit branch at a point between the second lead conductor and said source, the shiftable contactor on one of said slidewires being connected to said third lead conductor, and the shiftable contactor on the other of said slidewires being connected to said fourth lead conductor.

9. Apparatus as specified in claim 6 wherein a temperature compensating resistor is connected between said first lead conductor and one of said first opposing pair of bridge junctions.

10. A measuring apparatus comprising in combination, a Wheatstone bridge circuit having a first and second pair of bridge junctions and four strain resistors for its arms at least one of said resistors being responsive to the strain condition being measured, an energizing circuit branch connected between one opposing pair of bridge junctions and including an energizing current source and a temperature compensating resistor, a slide-wire resistor and damping means connected between the second pair of bridge junctions, a wiper contact engaging and adjustable along said slidewire resistor and connected to said energizing circuit branch, automatic rebalancing means including an amplifier responsive to the potential difference between the ends of said slidewire resistor and a rebalancing motor actuated by said amplifier to adjust the wiper contact engaging the slidewire resistor required to equalize the potential of the second pair of bridge junctions, and zero adjusting means connected between said pair of bridge junctions and said energizing circuit branch.

11. A measuring apparatus comprising in combination, a bridge circuit having a first and second pair of opposing bridge junctions and four strain responsive resistors for its arms, said strain responsive resistors being so arranged that two of the opposing arms decrease in resistance while the other two opposing arms increase in resistance in response to strain in one direction and in response to strain in the opposing direction, the former pair of opposing arms increase in resistance while the latter two opposing arms decrease in resistance, an energizing circuit branch connected between one opposing pair of bridge junctions and including an energizing current source and a temperature compensating resistor, a slidewire resistor and damping means connected between the second pair of bridge junctions, a wiper contact engaging and adjustable along said slidewire resistor and connected to said energizing circuit branch, automatic rebalancing means including an amplifier responsive to the potential difference between the ends of said slidewire resistor and a rebalancing motor actuated by said amplifier to adjust the wiper contact engaging the slidewire resistor required to equalize the potentials of the second pair of bridge junctions, and zero adjusting means connected between said second pair of bridge junctions and said energizing circuit branch.

12. Strain measuring apparatus comprising in combination, strain responsive resistors connected to form the arms and junctions of a Wheatstone bridge circuit, each of said resistors being arranged to increase and decrease in resistance in response to a strain force change in one direction or in the opposite direction, respectively, and each opposed pair of resistors being arranged to increase or decrease in resistance in response to a change in the direction of strain which causes the other two resistors to respectively decrease and increase in resistance, an energizing circuit branch connected between an opposed pair of bridge junctions by means of lead conductors and including an energizing current source, a slidewire resistor connected between the second pair of bridge junctions, a wiper contact engaging and adjustable along said slidewire resistor and connected to said energizing circuit branch, automatic rebalancing means including an amplifier responsive to the potential difference between the ends of said slidewire resistor and a rebalancing motor actuated by said amplifier to adjust the wiper contact engaging the slidewire resistor required to equalize the potentials of the second pair of bridge junctions, and zero adjusting means comprising a second slidewire resistor in parallel with the first mentioned slidewire resistor, a second wiper contact engaging and adjustable along said second slidewire resistor, and a conductor connecting said second wiper contact to said energizing circuit.

13. Apparatus as specified in claim 12 in which each of said wiper contacts is connected to said energizing circuit branch at a point between one terminal of said current source and the lead conductor connecting said terminal to one of said second pair of bridge junctions.

14. Measuring apparatus comprising in combination, a bridge circuit having four strain responsive resistors for its arms and a first and second pair of opposing bridge junctions, said strain responsive resistors being so arranged that two of the opposing arms decrease in resistance while the other two opposing arms increase in resistance in response to strain in one direction and in response to strain in the opposite direction, the former pair of opposing arms increase in resistance while the latter two opposing arms decrease in resistance, an energizing circuit branch connected between an opposing pair of bridge junctions and including an energizing current source, a slidewire resistor connected between the second pair of bridge junctions, a wiper contact engaging and adjustable along said slidewire resistor and connected to said energizing circuit branch, automatic rebalancing means including an amplifier responsive to the potential difference between the ends of said slidewire resistor and a rebalancing motor actuated by said amplifier to adjust the wiper contact engaging the slidewire resistor required to equalize the potentials of the second pair of bridge junctions, and zero adjusting means comprising second and third slidewire resistors connected in parallel with said energizing current source and second and third wiper contacts engaging and adjustable along the lengths of said second and third slidewire resistors, each of said wiper contacts being connected to one of said second pair of bridge junctions.

15. Strain measuring apparatus comprising in combination, strain responsive resistors connected to form the arms and junctions of a Wheatstone bridge circuit, each of said resistors being arranged to increase and decrease in resistance in response to a strain force change in one direction or in the other direction, respectively, and each opposed pair of resistors being arranged to increase or decrease in resistance in response to a change in the direction of strain which causes the other two resistors to respectively decrease and increase in resistance, an energizing circuit branch connected between a first opposing pair of bridge junctions and including an energizing current source and a lead conductor connecting said source to one of the first opposing pair of bridge junctions, a slidewire resistor circuit branch connected between a second pair of opposed bridge junctions including a slidewire resistor and two equal resistors at least one of which is shunted with a condenser to provide damping for said apparatus, a wiper contact engaging and adjustable along said slidewire resistor, a variable span adjusting resistor connected between said wiper contact and said energizing circuit branch at a point between said source and the lead conductor interposed between said source and one of said first pair of bridge junctions, and automatic rebalancing means including an amplifier responsive to the potential difference between the ends of said slidewire resistor and a rebalancing motor actuated by said amplifier to adjust the wiper contact engaging the slidewire resistor required to equalize the potentials of the second pair of bridge junctions.

16. In combination, an electrical bridge circuit having for its arms impedance elements at least one of which is sensitive to a condition to be measured, said bridge circuit having a pair of terminals and a pair of output terminals, a measuring circuit having six terminals and comprising a bridge energizing source, span adjusting means, zero adjusting means, a rebalancing circuit including a slidewire resistance having a shiftable contactor, a reversible motor for actuating said shiftable contactor, and an amplifier for controlling said motor, the input of said amplifier being connected to the first and second of said six terminals, said zero adjusting means and said rebalancing circuit being connected to the third and fourth of said six terminals, said bridge energizing source being connected to the fifth and sixth of said six terminals, said shiftable contactor being connected to the fifth of said six terminals, the span adjusting means being included in said last named connection, first and second lead conductors connecting the first and second of said six terminals to the output terminals of said bridge circuit, third and fourth lead conductors connecting the third and fourth of said six terminals to the output terminals of said bridge circuit, and fifth and sixth lead conductors connecting the fifth and sixth of said terminals to the input terminals of said bridge circuit.

17. Apparatus as specified in claim 16 wherein the resistance of the third and fourth of said six lead conductors are equal and the resistance of the fifth of said six lead conductors is equal to one-half of the equal resistances of said third and fourth lead conductors.

18. Apparatus as specified in claim 16 wherein a temperature compensating resistor is connected between the fifth of said lead conductors and the input terminal of said bridge circuit.

19. Apparatus as specified in claim 18 wherein the resistance of the rebalancing circuit is equal to twice the nominal resistance of the bridge circuit plus four times the nominal resistance of the temperature compensating resistor.

20. Apparatus as specified in claim 18 wherein the resistances of the zero adjusting means, and the rebalancing circuit, have been apportioned with respect to the nominal resistances of the temperature compensating resistor and the bridge circuit in such a manner that the effect on bridge measurements of the resistances of the various lead conductors has been neutralized.

21. A measuring apparatus comprising, in combination, a bridge circuit having impedance arms, at least one of which is adjustable in accordance with the magnitude of a variable, an energizing circuit branch connected between an opposed pair of bridge junctions and including an energizing current source, a slidewire resistor connected between the second pair of bridge junctions, a wiper contact engaging and adjustable along said slidewire resistor, a variable span adjusting resistor connected between said wiper contact and said energizing circuit branch, an automatic rebalancing means including an amplifier responsive to the potential difference between the ends of said slidewire resistor, and a reblancing motor actuated by said amplifier to adjust the wiper contact engaging the slidewire resistor required to equalize the potentials of the second pair of bridge junctions.

References Cited in the file of this patent

UNITED STATES PATENTS

| | | |
|---|---|---|
| 2,210,936 | Geyger | Aug. 13, 1940 |
| 2,368,912 | Barnes | Feb. 6, 1945 |
| 2,545,007 | Schultheis | Mar. 13, 1951 |
| 2,628,332 | Richardson | Feb. 10, 1953 |